(12) United States Patent
Haddad et al.

(10) Patent No.: US 9,739,133 B2
(45) Date of Patent: Aug. 22, 2017

(54) IMAGING UNDERGROUND OBJECTS USING SPATIAL SAMPLING CUSTOMIZATION

(71) Applicant: Vermeer Corporation, Pella, IA (US)

(72) Inventors: Waleed Sami Haddad, San Francisco, CA (US); David Hanson, Pella, IA (US)

(73) Assignee: VERMEER CORPORATION, Pella, IA (US)

( * ) Notice: Subject to any disclaimer, the term of this patent is extended or adjusted under 35 U.S.C. 154(b) by 852 days.

(21) Appl. No.: 13/836,045

(22) Filed: Mar. 15, 2013

(65) Prior Publication Data
US 2014/0262509 A1 Sep. 18, 2014

(51) Int. Cl.
 *E21B 44/00* (2006.01)
 *G01V 3/18* (2006.01)
 *E21B 44/02* (2006.01)

(52) U.S. Cl.
 CPC ............ *E21B 44/00* (2013.01); *E21B 44/02* (2013.01); *G01V 3/18* (2013.01)

(58) Field of Classification Search
 CPC ............ G01V 3/18; E21B 44/02; E21B 44/00
 USPC .................. 702/9; 175/27, 24; 75/27, 24
 See application file for complete search history.

(56) References Cited

U.S. PATENT DOCUMENTS

| 3,288,242 A | 11/1966 | Loeb |
| 3,852,743 A | 12/1974 | Gupta |
| 4,297,699 A | 10/1981 | Fowler et al. |
| 4,430,653 A | 2/1984 | Coon et al. |
| 4,492,865 A | 1/1985 | Murphy et al. |
| 4,504,833 A | 3/1985 | Fowler et al. |
| 4,676,695 A | 6/1987 | Duthweiler |
| 4,686,475 A | 8/1987 | Kober et al. |
| 4,698,634 A | 10/1987 | Alongi et al. |
| 4,709,237 A | 11/1987 | Poullain et al. |

(Continued)

FOREIGN PATENT DOCUMENTS

| DE | 9108986 | 12/1991 |
| DE | 9214241 | 1/1993 |

(Continued)

OTHER PUBLICATIONS

"AD8349 Data Sheet Rev. B", http://www.analog.com/static/imported-files/data_sheets/AD8349.pdf, Feb. 24, 2012.

(Continued)

*Primary Examiner* — Gregory J Toatley
*Assistant Examiner* — Yoshihisa Ishizuka
(74) *Attorney, Agent, or Firm* — Hollingsworth Davis, LLC

(57) ABSTRACT

A system includes a drill string to which a sensor is attached, a rotation unit configured to rotate the drill string, and a displacement unit configured to longitudinally displace the drill string. A processor is coupled to the rotation and displacement units. The processor is configured to coordinate sampling, by the sensor, of three-dimensional space surrounding the sensor while rotating and displacing the drill string. The processor is further configured to coordinate adjusting of at least one of drill string rotation and drill string displacement so that acceptable spatial sampling of the space surrounding the sensor is achieved.

26 Claims, 9 Drawing Sheets

(56) References Cited

U.S. PATENT DOCUMENTS

| | | |
|---|---|---|
| 4,710,708 A | 12/1987 | Rorden et al. |
| 4,728,897 A | 3/1988 | Gunton |
| 4,806,869 A | 2/1989 | Chau et al. |
| 4,814,768 A | 3/1989 | Chang |
| 4,843,597 A | 6/1989 | Gjessing et al. |
| 4,873,513 A | 10/1989 | Soults et al. |
| 4,896,116 A | 1/1990 | Nagashima et al. |
| 4,899,322 A | 2/1990 | Crutcher et al. |
| 4,905,008 A | 2/1990 | Kawano et al. |
| 4,912,643 A | 3/1990 | Beirne |
| 5,033,031 A | 7/1991 | Bohman |
| 5,065,098 A | 11/1991 | Salsman et al. |
| 5,092,657 A | 3/1992 | Bryan, Jr. |
| 5,103,920 A | 4/1992 | Patton |
| 5,113,192 A | 5/1992 | Thomas |
| 5,264,795 A | 11/1993 | Rider |
| 5,274,557 A | 12/1993 | Moriya et al. |
| 5,321,613 A | 6/1994 | Porter et al. |
| 5,325,095 A | 6/1994 | Vadnais et al. |
| 5,337,002 A | 8/1994 | Mercer |
| 5,339,080 A | 8/1994 | Steinway et al. |
| 5,341,886 A | 8/1994 | Patton |
| 5,357,253 A | 10/1994 | Van Etten |
| 5,365,442 A | 11/1994 | Schmidt |
| 5,370,478 A | 12/1994 | Bartlett et al. |
| 5,375,663 A | 12/1994 | Teach |
| 5,384,715 A | 1/1995 | Lytton |
| 5,410,252 A | 4/1995 | Potter et al. |
| 5,412,623 A | 5/1995 | Asada et al. |
| 5,446,981 A | 9/1995 | Kamada et al. |
| 5,469,155 A | 11/1995 | Archambeault et al. |
| 5,471,771 A | 12/1995 | Gilbert |
| 5,499,029 A | 3/1996 | Bashforth et al. |
| 5,509,220 A | 4/1996 | Cooper |
| 5,512,834 A | 4/1996 | McEwan |
| 5,528,518 A | 6/1996 | Bradshaw et al. |
| 5,544,052 A | 8/1996 | Fujita et al. |
| 5,546,572 A | 8/1996 | Seto et al. |
| 5,553,407 A | 9/1996 | Stump |
| 5,585,726 A | 12/1996 | Chau |
| 5,607,205 A | 3/1997 | Burdick et al. |
| 5,614,670 A | 3/1997 | Nazarian et al. |
| 5,631,970 A | 5/1997 | Hsu |
| 5,633,589 A | 5/1997 | Mercer |
| 5,644,237 A | 7/1997 | Eslambolchi et al. |
| 5,659,985 A | 8/1997 | Stump |
| 5,673,050 A | 9/1997 | Moussally et al. |
| 5,682,136 A | 10/1997 | Del Signore |
| 5,698,981 A | 12/1997 | Mercer |
| 5,704,142 A | 1/1998 | Stump |
| 5,711,381 A | 1/1998 | Archambeault et al. |
| 5,720,354 A | 2/1998 | Stump et al. |
| 5,746,278 A | 5/1998 | Bischel |
| 5,757,320 A | 5/1998 | McEwan |
| 5,764,062 A | 6/1998 | Mercer |
| 5,767,678 A | 6/1998 | Mercer |
| 5,769,503 A | 6/1998 | Stolarczyk et al. |
| 5,774,091 A | 6/1998 | McEwan |
| 5,786,537 A | 7/1998 | Anstey |
| 5,805,110 A | 9/1998 | McEwan |
| 5,819,859 A | 10/1998 | Stump et al. |
| 5,825,660 A | 10/1998 | Cagan et al. |
| 5,844,564 A | 12/1998 | Bennis et al. |
| 5,867,117 A | 2/1999 | Gogineni et al. |
| 5,872,537 A | 2/1999 | Siweris |
| 5,899,958 A * | 5/1999 | Dowell ............... E21B 47/0002 175/50 |
| 5,904,210 A | 5/1999 | Stump et al. |
| 5,933,014 A | 8/1999 | Hartrumpf et al. |
| 5,947,213 A | 9/1999 | Angle et al. |
| 6,014,343 A | 1/2000 | Graf et al. |
| 6,035,951 A | 3/2000 | Mercer et al. |
| 6,072,427 A | 6/2000 | McEwan |
| 6,078,869 A | 6/2000 | Gunasekera |
| 6,088,294 A | 7/2000 | Leggett, III et al. |
| 6,106,561 A | 8/2000 | Farmer |
| 6,119,804 A | 9/2000 | Owen |
| 6,150,976 A | 11/2000 | Cooley |
| 6,151,555 A | 11/2000 | Van Bemmel et al. |
| 6,195,922 B1 | 3/2001 | Stump |
| 6,216,540 B1 | 4/2001 | Nelson |
| 6,225,941 B1 | 5/2001 | Gogineni et al. |
| 6,252,538 B1 | 6/2001 | Chignell |
| 6,302,221 B1 | 10/2001 | Hamman et al. |
| 6,307,573 B1 | 10/2001 | Barros |
| 6,308,787 B1 | 10/2001 | Alft |
| 6,313,755 B1 | 11/2001 | Hetmaniak et al. |
| 6,315,062 B1 | 11/2001 | Alft et al. |
| 6,327,533 B1 | 12/2001 | Chou |
| 6,363,320 B1 | 3/2002 | Chou |
| 6,373,486 B1 | 4/2002 | Simpson |
| 6,377,201 B1 | 4/2002 | Chu |
| 6,377,210 B1 | 4/2002 | Moore |
| 6,389,360 B1 | 5/2002 | Alft et al. |
| 6,414,627 B1 | 7/2002 | McEwan |
| 6,435,286 B1 | 8/2002 | Stump et al. |
| 6,437,726 B1 | 8/2002 | Price |
| 6,462,696 B1 | 10/2002 | Gorman |
| 6,477,795 B1 | 11/2002 | Stump |
| 6,484,818 B2 | 11/2002 | Alft et al. |
| 6,501,413 B2 | 12/2002 | Annan et al. |
| 6,522,290 B2 | 2/2003 | Mattox |
| 6,532,190 B2 | 3/2003 | Bachrach |
| 6,617,856 B1 | 9/2003 | Royle |
| 6,667,709 B1 | 12/2003 | Hansen et al. |
| 6,700,526 B2 | 3/2004 | Witten |
| 6,701,647 B2 | 3/2004 | Stump |
| 6,719,069 B2 | 4/2004 | Alft et al. |
| 6,739,165 B1 | 5/2004 | Strack |
| 6,751,553 B2 | 6/2004 | Young et al. |
| 6,755,263 B2 | 6/2004 | Alft et al. |
| 6,766,253 B2 | 7/2004 | Burns et al. |
| 6,833,795 B1 | 12/2004 | Johnson et al. |
| 6,886,644 B2 | 5/2005 | Stump et al. |
| 6,915,211 B2 | 7/2005 | Kram et al. |
| 6,975,942 B2 | 12/2005 | Young et al. |
| 6,980,482 B2 | 12/2005 | Faichney et al. |
| 7,013,991 B2 | 3/2006 | Wilson-Langman et al. |
| 7,034,740 B2 | 4/2006 | Witten |
| 7,065,446 B2 | 6/2006 | Chou |
| 7,072,668 B2 | 7/2006 | Chou |
| 7,085,196 B2 | 8/2006 | Nemeth |
| 7,113,124 B2 | 9/2006 | Waite |
| 7,123,016 B2 | 10/2006 | Larsen |
| 7,143,844 B2 | 12/2006 | Alft et al. |
| 7,182,151 B2 | 2/2007 | Stump et al. |
| 7,184,611 B2 | 2/2007 | Miyagi et al. |
| 7,202,801 B2 | 4/2007 | Chou |
| 7,218,244 B2 | 5/2007 | Jin et al. |
| 7,400,976 B2 | 7/2008 | Young et al. |
| 7,424,133 B2 | 9/2008 | Schultz et al. |
| 7,588,083 B2 | 9/2009 | Newman |
| 7,612,704 B2 | 11/2009 | Ryerson et al. |
| 7,676,534 B2 | 3/2010 | Murakami et al. |
| 7,930,103 B2 | 4/2011 | Young et al. |
| 8,207,887 B2 | 6/2012 | Goldman |
| 8,220,564 B2 | 7/2012 | Runquist et al. |
| 8,280,634 B2 | 10/2012 | Young et al. |
| 2002/0130806 A1 | 9/2002 | Taylor et al. |
| 2003/0012411 A1 | 1/2003 | Sjostrom et al. |
| 2003/0090406 A1* | 5/2003 | Longstaff ............ G01S 13/0209 342/22 |
| 2004/0168358 A1 | 9/2004 | Stump |
| 2004/0195004 A1* | 10/2004 | Power ................... E21B 44/02 175/24 |
| 2005/0257610 A1 | 11/2005 | Gillen et al. |
| 2007/0152054 A1 | 7/2007 | Bonavides et al. |
| 2008/0079723 A1 | 4/2008 | Hanson et al. |
| 2009/0266609 A1* | 10/2009 | Hall ....................... E21B 47/00 175/45 |
| 2010/0207711 A1 | 8/2010 | Estes |

(56) References Cited

U.S. PATENT DOCUMENTS

| | | | | |
|---|---|---|---|---|
| 2010/0300756 | A1* | 12/2010 | Bergstrom | G01V 3/26 175/45 |
| 2011/0031015 | A1* | 2/2011 | Downton | E21B 47/12 175/27 |
| 2015/0083518 | A1* | 3/2015 | Bonavides | G01V 1/143 181/106 |

FOREIGN PATENT DOCUMENTS

| | | |
|---|---|---|
| DE | 19509934 | 10/1995 |
| DE | 19845330 | 4/2000 |
| DE | 10018031 | 10/2001 |
| EP | 0269283 | 6/1988 |
| EP | 0289623 | 9/1993 |
| FR | 2673002 | 8/1992 |
| JP | 03187423 | 8/1991 |
| JP | 6230141 | 8/1994 |
| NL | 9002065 | 4/1992 |

OTHER PUBLICATIONS

Aaltonen et al., "Geological Mapping Using GPR and Differential GPS Positioning: A Case Study", Proceedings of the Ninth International Conference on GPR, Apr. 29-May 2, 2002, Santa Barbara, California, pp. 207-210.
Akita et al., "Practical Usage and Future Prospects of a Mapping System Using a Pen-Based Computer", Proceedings AM/FM International Annual Conference, Mar. 20, 1995, pp. 699-707.
Alippi et al., "Hardware Requirements for Digital VLSI Implementation of Neural Networks", IEEE International Joint Conference on Neural Networks, vol. 3, 1991, pp. 1873-1878 (Abstract only).
AWPA—"Uniform Color Code", Mar. 6, 2001—http://web.archive.org/web/20010306004125/http://callbeforeyoudig.org/color.htm.
Baker et al., "Source-Dependent Frequency Content of Ultrashallow Seismic Reflection Data", Bulletin of the Seismological Society of America, 90, 2, p. 494-499, Apr. 2000.
Bakhtar et al., "Testing and UXO Detection Using US Air Force EarthRadar System," Mar. 1996.
Bernold et al., "A Multi-Sensory Approach to 3-D Mapping of Underground Utilities", 19th Proceedings of International Symp. on Automation & Robotics in Construction, Sep. 23-25, 2002.
Chuang et al., "A Highly Capable Arbitrary Waveform Generator for Next Generation Radar Systems", Aerospace Conference, 2006 IEEE, 5 pages.
"Ditch Witch Subsite Trac Management System Plus", http://www.ditchwitch.com/produtct/productview/138 Accessed Aug. 13, 2002.
Dobecki et al. "Geotechnical and Groundwater Geophysics." Geophysics, vol. 50, No. 12, Dec. 1985, p. 2621-2636 (abstract only).
Dussauge-Peisser et al., Investigation of a fractured limestone cliff (Chartreuse Massif, France) using seismic tomography and ground-penetrating radar Near Surface Geophysics, 1, 161-170, Aug. 2003.
Farquharson et al., "A 50-800 MHz stepped frequency continuous wave ground penetrating radar", Communications and Signal Processing, 1998. Comsig '98. Proceedings of the 1998 South African Symposium on Rondebosch, South Africa Sep. 7-8, 1998. New York, NY, USA, IEEE, US, pp. 455-460. (abstract only).
Figdor et al. "Geophysical reconnaissance of covered waste disposal grounds." OEIAZ Austrian Engineer and Architects' Magazine, vol. 134, No. 9, Austria, Sep. 1989. pp. 450-456.
Frohlich et al., "Exploring geo-scientific data in virtual environments", Proceedings of the Conference on Visualization 1999: Celebrating Ten Years, IEEE Visualization, IEEE Computer Society Press, Los Alamitos, CA, pp. 169-173, Oct. 1999.
Guenther et al., Proceedings of the Fifth International Conference on Ground Penetrating Radar, The Geophysical Investigation of Drilling Obstacles for Microtunnelling Projects by Means of GPR, vol. 3 of 3, Jun. 1994, pp. 1151-1165. (Abstract only).
Haizhong et al., Derivative Seismic Processing Method for GPR Data, 1997 IEEE, pp. 145-147. (Abstract only).

Herman, "Robotic Subsurface Mapping Using Ground Penetrating Radar", PhD thesis, Carnegie Mellon University, May 1997, 143 pages.
Hodgson, "Computerized Well Planning for Directional Wells", SPE, No. 12071, Oct. 8, 1983, pp. 1-6 (abstract only).
Hussain et al., Application of Migration to Ground Probing Radars, 1988 IEEE, pp. 1208-1211. (Abstract only).
Kathage, Proceedings of the Fourth International Conference on Ground Penetrating Radar, Geological Survey of Finland, A Challenge: GPR in Advance of Horizontal Drilling, Special Paper 16, Jun. 1992, pp. 119-124. (Abstract only).
Lee, "A GNU Radio Based Software-Defined Radar", http://etd.ohiolink.edu/send-pdf.cgi/PattonLee.pdf?wright1176142845, Apr. 9, 2007.
Liu, "Using GPR and seismic reflection measurements to characterize buried objects: large-scale simulation." IGARSS '97. 1997 In'tl Geoscience and Remote Sensing Symposium. pp. 1147-1149, vol. 3.
Liu et al. "Identification of paleo-liquefaction and deformation features with GPR in the New Madrid seismic zone." The 8th Int'l Conference of Ground Penetrating Radar. Goldcoast, May 23-26, 2000. vol. 4084, pp. 383-389 (abstract only).
McFee et al., "Multisensor vehicle-mounted teleoperated mine detector with data fusion", Proc. SPIE, vol. 3392, 1082, 1998, abstract only.
Parker, "Buried Facility Locating with GPS Interface," GBIS '99, Edmonton, Dec. 1999.
Powers et al., "Integrated Use of Continuous Seismic-Reflection Profiling and Ground-Penetrating Radar Methods at John's Pond, Cape Cod, Massachusetts", 12th Proceeding on Applications of Geophysics to Eng. & Environment, 1999 (abstract only).
Reinhard et al., "An IQ-modulator based heterodyne 77-GHz FMCW radar", Microwave Conference (GEMIC), 2011 German, IEEE, Mar. 14, 2011, pp. 1-4. (abstract only).
Santos, "The Development and Field Application of a 3D Computer Graphics System for Displaying Wellbore Trajectories", SPE, No. 29197, Nov. 10, 1994, pp. 371-382.
Schwamborn et al. "Ground penetrating radar and shallow seismic—stratigraphic and permafrost investigations of Lake Nikolay, Delta Lena and Arctic Siberia." The 8th Int'l Conference of Ground Penetrating Radar. Goldcoast, May 23-26, 2000. vol. 4084, 2000, pp. 783-789 (abstract only).
Shoemaker et al., "Reflection Seismic and Ground Penetrating Radar Study of Previously Mined (Lead/Zinc) Ground", Joplin, Missouri, Missouri Department of Transportation special publication, 2000, 15 pages.
Tektronix, "Generating Advanced Radar Signals Using Arbitrary Waveform Generators", www.tektronix.com/signal_generators. 26 pages.
Van der Veen et al., "Design and application of a towed landstreamer system for cost-effective 2-D and pseudo-3-D shallow seismic data acquisition", Geophysics, vol. 66, No. 2, (Mar.-Apr. 2001), p. 482-500.
Van Dijk et al., "Multi-mode FMCW radar array with independent digital beam steering for transmit and receive", 2008 5th European Radar Conference (EURAD 2008); Oct. 30-31, 2008, Amsterdam, Netherlands, IEEE, Piscataway, NJ. pp. 412-415. (abstract only).
Well et al. Investigations of Hazardous Waste Sites Using Thermal IR and Ground Penetrating Radar, Photogrammetric Engineering & Remote Sensing, vol. 60, No. 8, Aug. 1994, pp. 999-1005. (Abstract only).
White, "Building an Urban Image." Archeologia e Calcolatori (International Association of Computing in Archaeology, Rome Italy), vol. 7, 1996, 137-147 (abstract only).
Yasunaga et al., "Design, Fabrication and Evaluation of a 5-inch Wafer Scale Neural Network LSI Composed of 576 Neurons", IEEE International Joint Conference on Neural Networks, vol. II, 1990, pp. 527-535.
Yoder et al., "Mapping agricultural fields with GPR and EMI to predict offsite movement of agrochemicals", Proc. SPIE, vol. 4084, 20, 2000, abstract only.
Geophysical Survey Systems, Inc.,RADAN™—Radar Data Analyzer, Production Information Sheet, Jan. 1993.

(56) References Cited

OTHER PUBLICATIONS

Geophysical Survey Systems, Inc., Subsurface Solutions, Winter 1995.
Geophysical Survey System, Inc., SIR® System-2 Subsurface Interface Radar, Brochure.
Geophysical Survey System, Inc., SIR® System-10A Subsurface Interface Radar, Brochure.
Geophysical Survey System, Inc., SIR® System Antennas, Brochure.
Geophysical Survey System, Inc., Model 3200MLF, Multiple, Low-Frquency, Bistatic Antenna, Brochure.
Geophysical Survey System, Inc., Subsurface Detection Problems, Brochure.
Pollution Engineering, Peering Beneath the Surface, Article, Oct. 1992.
Sensors & Software, Inc., Pulse EKKO™ 100, Features, Brochure.
Sensors & Software, Inc., Pulse EKKO™ 100, Ground Penetrating Radar Technology, Brochure.
Sensors & Software, Inc., Pulse EKKO™ 100, Case Studies, pp. 80-83, 87-94, 98, 100, 129, 131.
Sensors & Software, Inc., Pulse EKKO™ 1000, Brochure.
Sensors & Software, Inc., Pulse EKKO™, Environment, Feb. 1994.

* cited by examiner

IMAGING UNDERGROUND OBJECTS USING SPATIAL SAMPLING CUSTOMIZATION

SUMMARY

Embodiments are directed to systems and methods for automated determination of acceptable spatial sampling of a rotationally dependent sensor used in a drilling operation. Embodiments are directed to systems and methods for automated determination of optimal spatial sampling of a rotationally dependent sensor used in a drilling operation. Various embodiments are directed to automated determination of acceptable spatial sampling required for a drill head mounted ground penetrating radar (GPR) used in horizontal directional drilling operations. Various embodiments are directed to automated determination of optimal spatial sampling required for a drill head mounted GPR used in horizontal directional drilling operations.

According to various embodiments, a method of the disclosure involves rotating a drill string to which a sensor is attached and displacing the drill string along a bore path. The method also involves sampling, using the sensor, three-dimensional space surrounding the sensor while rotating and displacing the drill string, and adjusting at least one of drill string rotation and drill string displacement so that acceptable spatial sampling of the space surrounding the sensor is achieved.

In accordance with other embodiments, a system of the disclosure includes a drill string to which a sensor is attached, a rotation unit configured to rotate the drill string, and a displacement unit configured to longitudinally displace the drill string. A processor is coupled to the rotation and displacement units. The processor is configured to coordinate sampling, by the sensor, of three-dimensional space surrounding the sensor while rotating and displacing the drill string. The processor is further configured to coordinate adjusting of at least one of drill string rotation and drill string displacement so that acceptable spatial sampling of the space surrounding the sensor is achieved.

These and other features can be understood in view of the following detailed discussion and the accompanying drawings.

DETAILED DESCRIPTION

Figure 1:
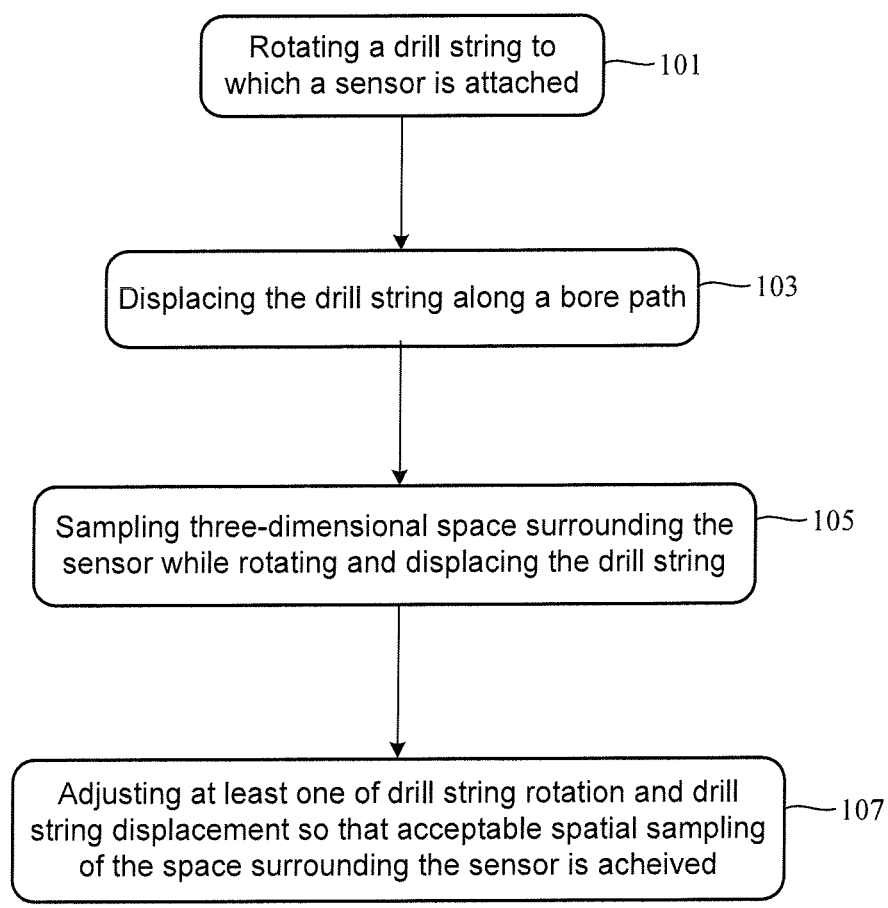
FIG. 1 illustrates various processes for imaging underground objects using spatial sampling customization according to various embodiments.

In the following description of the illustrated embodiments, references are made to the accompanying drawings forming a part hereof, and in which are shown by way of illustration, various embodiments by which the invention may be practiced. It is to be understood that other embodiments may be utilized, and structural and functional changes may be made without departing from the scope of the present invention.

Systems, devices or methods according to the present invention may include one or more of the features, structures, methods, or combinations thereof described herein. For example, a device or system may be implemented to include one or more of the useful features and/or processes described below. It is intended that such a device or system need not include all of the features described herein, but may be implemented to include selected features that provide for useful structures, systems, and/or functionality.

Embodiments are directed to systems and methods for automated determination of acceptable spatial sampling of a rotationally dependent sensor used in a drilling operation. Embodiments are directed to systems and methods for automated determination of optimal spatial sampling of a rotationally dependent sensor used in a drilling operation. A wide variety of sensors may be employed in systems and methods according to various embodiments. In general, suitable sensors include those that can sense for presence of an object in proximity, but not in contact, with the sensor, which allows for pre-collision detection of the object. Particularly useful sensors include those that generate a probe signal and sense for a reflected or return signal. The following is a non-exhaustive, non-limiting list of representative sensors that may be adapted for imaging underground objects using spatial sampling customization according to various embodiments: a radar sensor such as a ground penetrating radar, an acoustic sensor, a seismic sensor, an electromagnetic sensor, a magnetic field sensor, a time-domain electromagnetic (TDEM) sensor, a resistivity sensor, a permittivity sensor, a conductivity sensor, a thermal sensor, a capacitance sensor, and a magnetic field sensor (e.g., magnetometer).

In various embodiments, a single sensor system is employed for imaging underground objects using spatial sampling customization. In other embodiments, two or more disparate sensor systems are employed for imaging underground objects using spatial sampling customization. According to embodiments employing two or more disparate sensor systems, spatial sampling customization is performed for each sensor, and drilling parameters (e.g., drill string rotation and/or displacement) are adjusted so that acceptable spatial sampling of the space surrounding the sensors is achieved for all sensors. In some embodiments, disparate sensor systems are employed to provide independent underground object detection information. In other embodiments, disparate sensor systems are employed to provide composite underground object detection information, such as by using one or more fusion algorithms.

Turning now to FIG. 1, there is illustrated various processes for imaging underground objects using spatial sampling customization according to various embodiments. According to FIG. 1, spatial sampling customization involves rotating 101 a drill string to which a rotationally dependent sensor is attached, and displacing 103 the drill string along a bore path. The method of FIG. 1 further involves sampling 105 three-dimensional space surrounding the sensor while rotating and displacing the drill string, and adjusting 107 at least one of drill string rotation and drill string displacement so that acceptable spatial sampling of the space surrounding the sensor is achieved.

Figure 2:
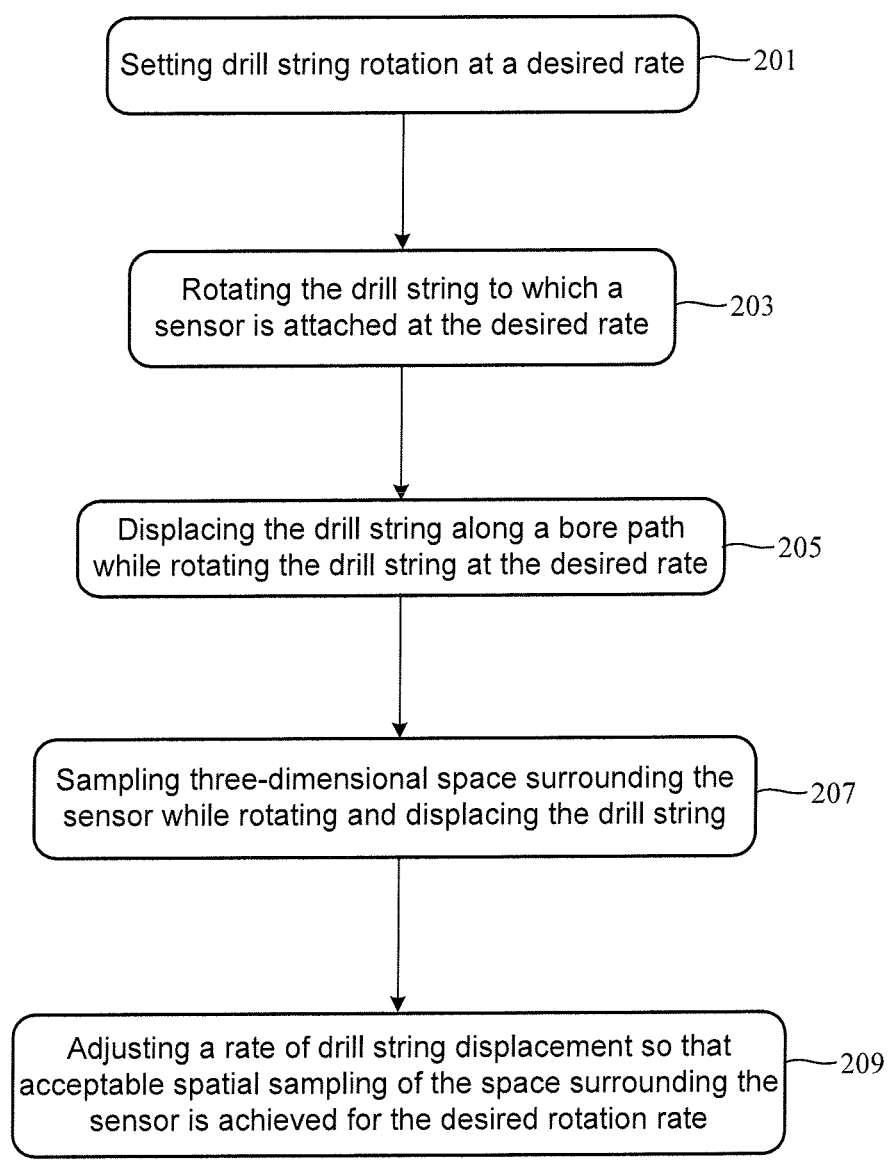
FIG. 2 shows various processes for imaging underground objects using spatial sampling customization according to other embodiments.

FIG. 2 illustrates various processes for imaging underground objects using spatial sampling customization according to various embodiments. The method according to FIG. 2 involves setting 201 drill string rotation at a desired rate, and rotating 203 the drill string to which a sensor is attached at the desired rate. The method of FIG. 2 further involves displacing 205 the drill string along a bore path while rotating the drill string at the desired rate. Spatial sampling customization according to FIG. 2 also involves sampling 207 three-dimensional space surrounding the sensor while rotating and displacing the drill string, and adjusting 209 a rate of drill string displacement so that acceptable spatial sampling of the space surrounding the sensor is achieved for the desired rotation rate.

Figure 3:
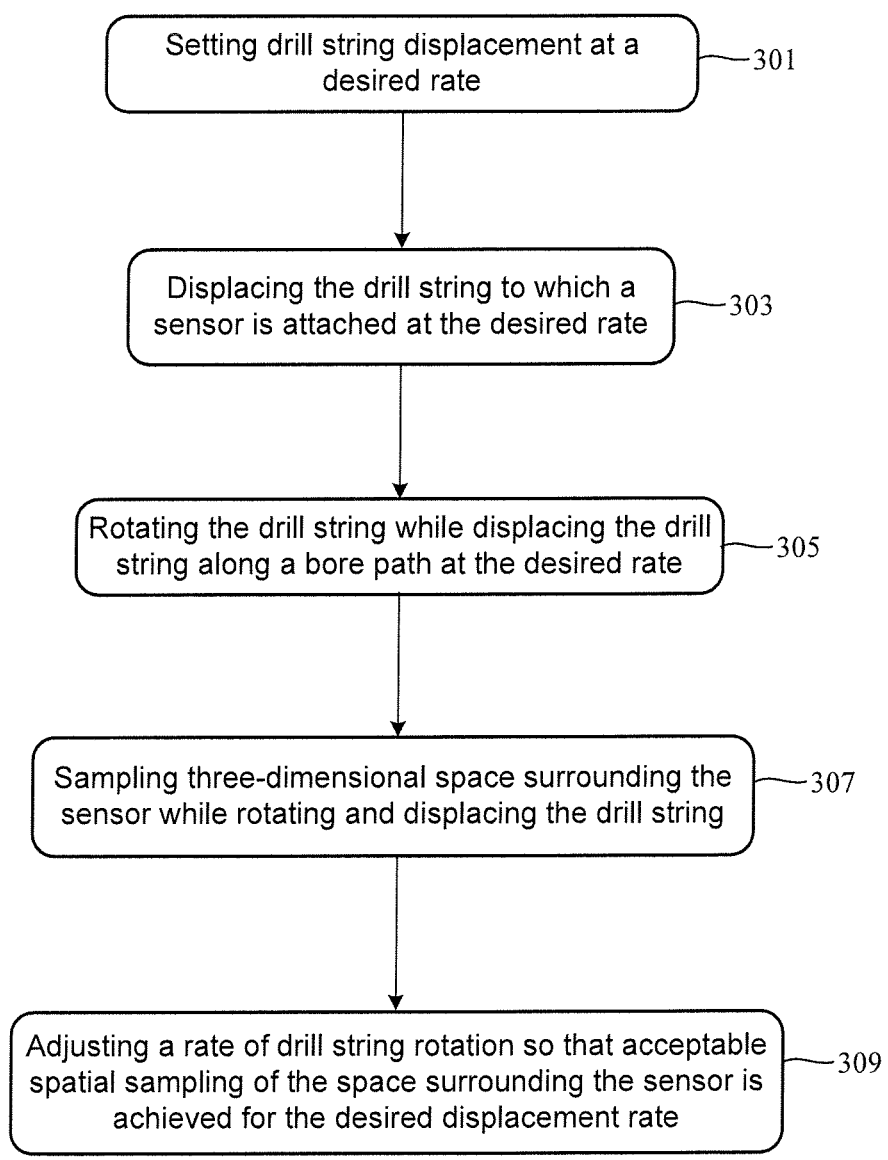
FIG. 3 shows various processes for imaging underground objects using spatial sampling customization according to further embodiments.

FIG. 3 illustrates various processes for imaging underground objects using spatial sampling customization according to various embodiments. The method according to FIG. 3 involves setting 301 drill string displacement at a desired rate, and displacing 303 the drill string to which a sensor is attached at the desired rate. The method of FIG. 3 further involves rotating 305 the drill string while displacing the drill string along a bore path at the desired rate. Spatial sampling customization according to FIG. 3 also involves sampling 307 three-dimensional space surrounding the sensor while rotating and displacing the drill string, and adjusting 309 a rate of drill string rotation so that acceptable spatial sampling of the space surrounding the sensor is achieved for the desired displacement rate.

Figure 4:
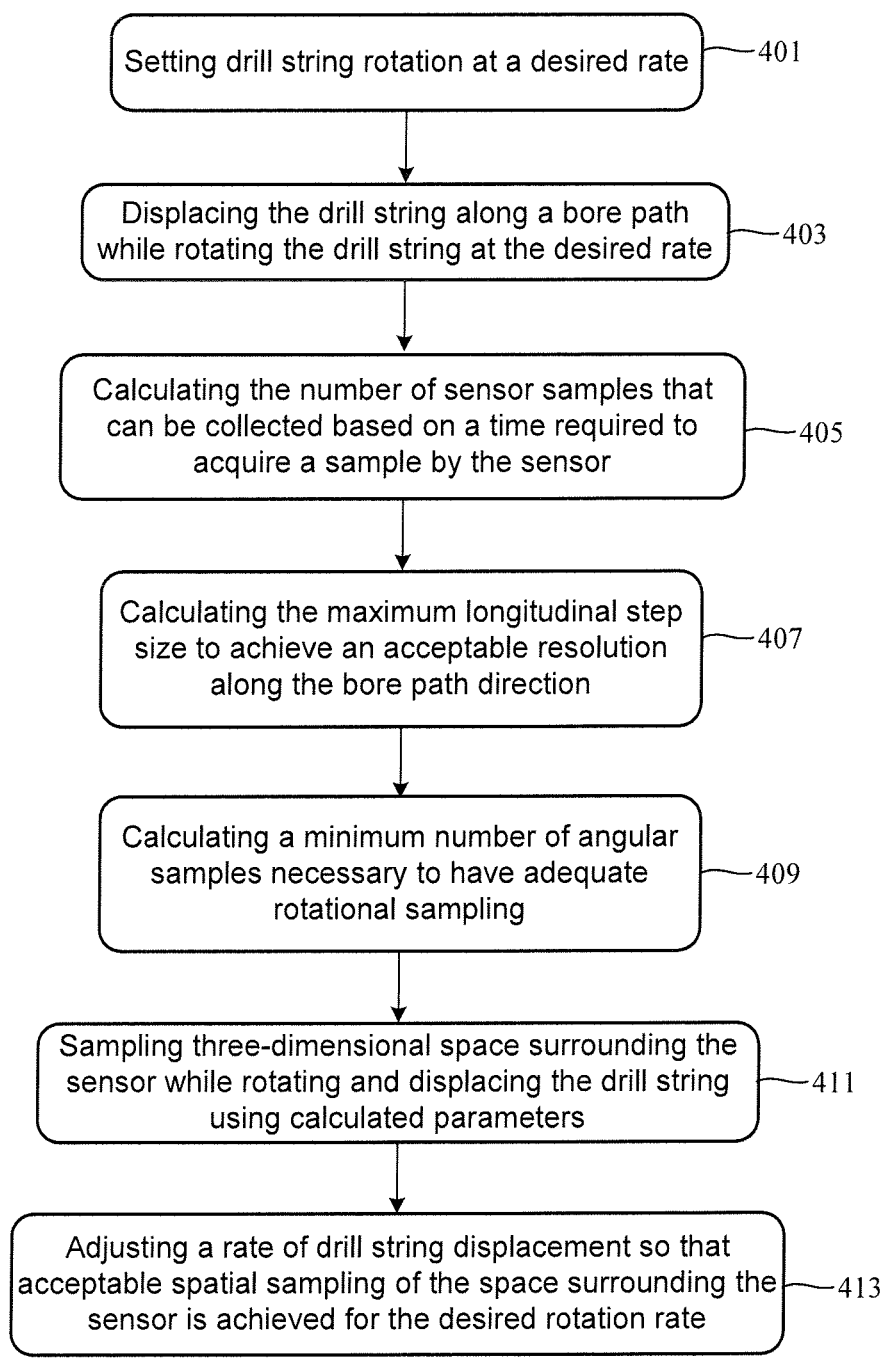
FIG. 4 illustrates various processes for imaging underground objects using spatial sampling customization according to various embodiments.

FIG. 4 illustrates various processes for imaging underground objects using spatial sampling customization according to various embodiments. The method according to FIG. 4 involves setting 401 drill string rotation at a desired rate, and displacing 403 the drill string to which a sensor is attached along a bore path while rotating the drill string at the desired rate. Spatial sampling customization according to FIG. 4 involves calculating 405 the number of sensor samples that can be collected based on a time required to acquire a sample by the sensor, calculating 407 the maximum longitudinal step size to achieve an acceptable resolution along the bore path direction, and calculating 409 a minimum number of angular samples necessary to have adequate rotational sampling. The method of FIG. 4 further involves sampling 411 three-dimensional space surrounding the sensor while rotating and displacing the drill string using the calculated parameters, and adjusting 413 a rate of drill string displacement so that acceptable spatial sampling of the space surrounding the sensor is achieved for the desired rotation rate.

Figure 5:
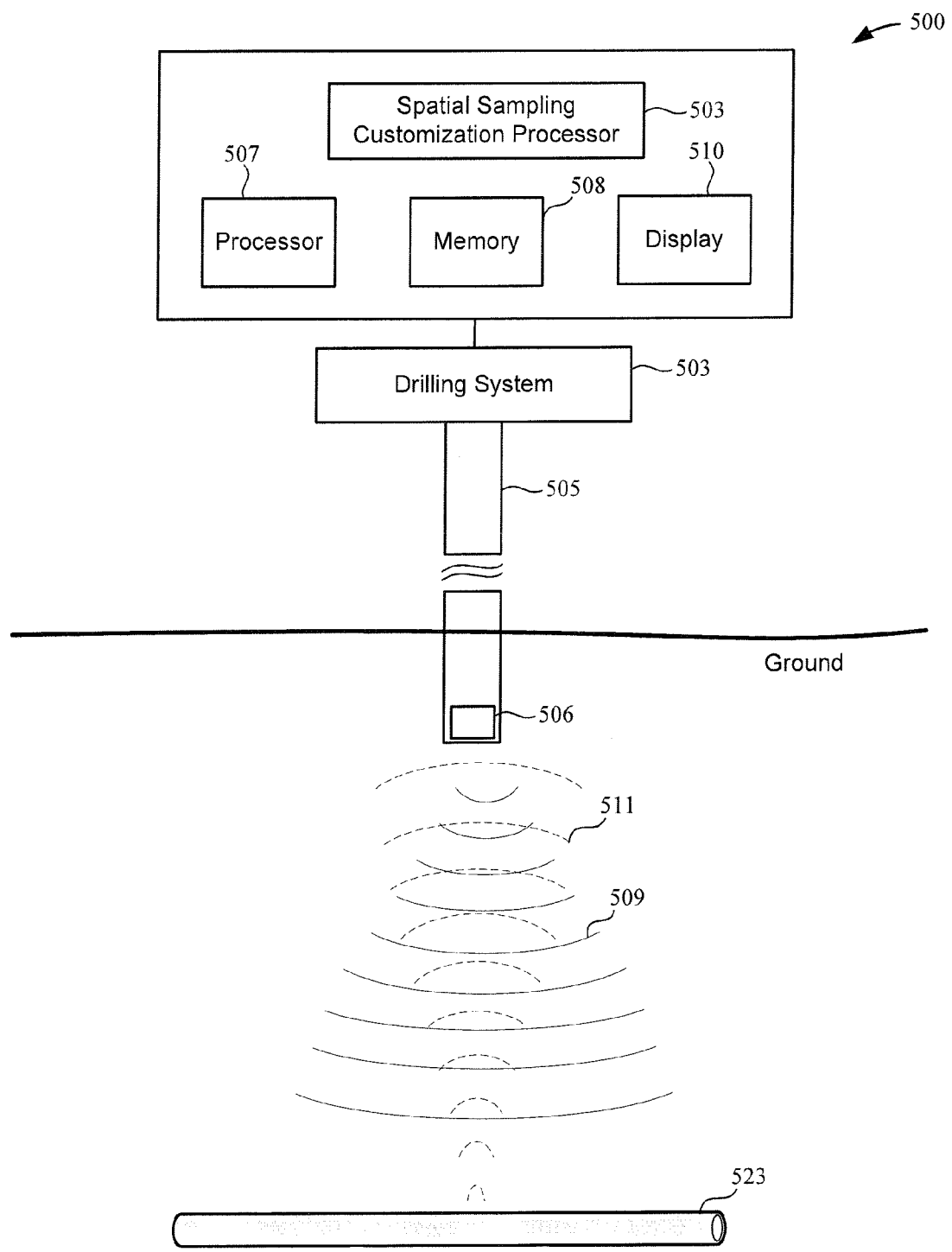
FIG. 5 shows a block diagram of a system for imaging underground objects using spatial sampling customization according to various embodiments.

With reference to FIG. 5, this figure shows a block diagram of a system 500 for imaging underground objects using spatial sampling customization according to various embodiments. The embodiment shown in FIG. 5 represents a system for imaging a subsurface for the presence of buried objects, such as utilities and manmade or natural obstacles, while drilling. According to some embodiments, the system 500 includes a drilling system 503 which includes a drill string 505 to which a sensor 506 is attached. The drilling system 503 includes a rotation unit configured to rotate the drill string 505 and a displacement unit configured to longitudinally displace the drill string 505. A processor 507/503 is coupled to the rotation and displacement units and configured to coordinate sampling, by the sensor 506, of three-dimensional space surrounding the sensor 506 while rotating and displacing the drill string 505, and adjusting at least one of drill string rotation and drill string displacement so that acceptable spatial sampling of the space surrounding the sensor 506 is achieved.

According to various embodiments, the system 500 includes a main processor 507 coupled to a memory 508 and a display 510. The main processor 507 is coupled to a spatial sampling customization processor 503, which is configured to implement spatial sampling customization algorithms in accordance with various embodiments disclosed herein.

The system 500 includes one or more sensors 506. As was discussed previously, representative sensors 506 that may be adapted for subsurface object detection using spatial sampling customization in accordance with embodiments of the disclosure include a GPR sensor, an acoustic sensor, a seismic sensor, an electromagnetic sensor, a magnetic field sensor, a TDEM sensor, a resistivity sensor, a permittivity sensor, a conductivity sensor, a thermal sensor, a capacitance sensor, and a magnetic field sensor (e.g., magnetometer).

According to some embodiments, the sensor 506 is configured to transmit a probe signal 509 that propagates through the subsurface and impinges on or illuminates an underground object, in this case a utility 523. Interaction between the utility 523 and the probe signal 509 results in a return signal 511 that is detected by the sensor 506. The main processor 507, in response to signals produced by the spatial sampling customization processor 503 and/or the sensor 506, can be configured to execute interlock logic that causes the processor 507 to limit at least one of drill string rotation and drill string displacement so that acceptable spatial sampling of the space surrounding a sensor 506 is achieved.

Spatial sampling customization software is preferably stored in the memory 508 and comprises program instructions executable by the spatial sampling customization processor 503 in accordance with spatial sampling customization algorithms described herein. The spatial sampling customization processor 503 may be implemented in software, hardware, or a combination of software and hardware. The spatial sampling customization processor 503 may be integral to the main processor 507 or may be implemented as a component separate from, but communicatively coupled with, the main processor 507. Output from the spatial sampling customization processor 503 and/or the main processor 507 can be presented on the display 510. Output from the spatial sampling customization processor 503 and/or the main processor 507 can also be communicated (via hardwire or wireless connection) to an external system, such as a PC, PDA, smartphone, network, geographic information system (GIS), or utility mapping system. Additional details for implementing utility mapping and managing utility mapping data in the context of various embodiments are disclosed in commonly owned U.S. Pat. No. 6,751,553, which is incorporated herein by reference.

In accordance with various embodiments, a spatial sampling customization facility is incorporated as a functional component of a horizontal directional drilling (HDD) machine. HDD machines are used to install utilities underground. Unfortunately, the use of drills in urban environments has the risk of striking and damaging pre-existing utilities. HDD machines according to various embodiments employ a radar unit designed to be installed on the HDD drill head and used to determine the presence of obstacles in or nearby the boring path. Transmit and receive antennas are mounted on the drill shaft, behind the drill head spade, and transmit both ahead and to the side of the drill head. In some representative implementations, data can be collected at up to 50 traces per second, and all processing and display is preferably done in real time. An exemplary GPR system suited for incorporation in a drill head of an HDD system in the context of various embodiments is disclosed in U.S. Pat. No. 7,013,991, which is incorporated herein by reference.

Horizontal directional drilling provides numerous advantages over the historical trench based techniques for subsurface utility installation. However, HDD does suffer from the constant threat of striking unknown, unmapped, or mislocated utilities and other obstacles. Striking these obstacles can cost the operator revenues, for repairs, or in more serious cases result in loss of equipment, injury, or death. Thus, there is a need for sensors that can be mounted on the drill head that detect obstacles far enough in advance to allow the drill operator to detect and/or map them. A spatial sampling customization facility incorporated into an HDD machine provides for improved or optimized detecting and/or mapping of obstacles to allow their avoidance, which is of great importance, especially when damaging one of these features could result in disruption of utility service or possible contaminant release.

Figure 6:
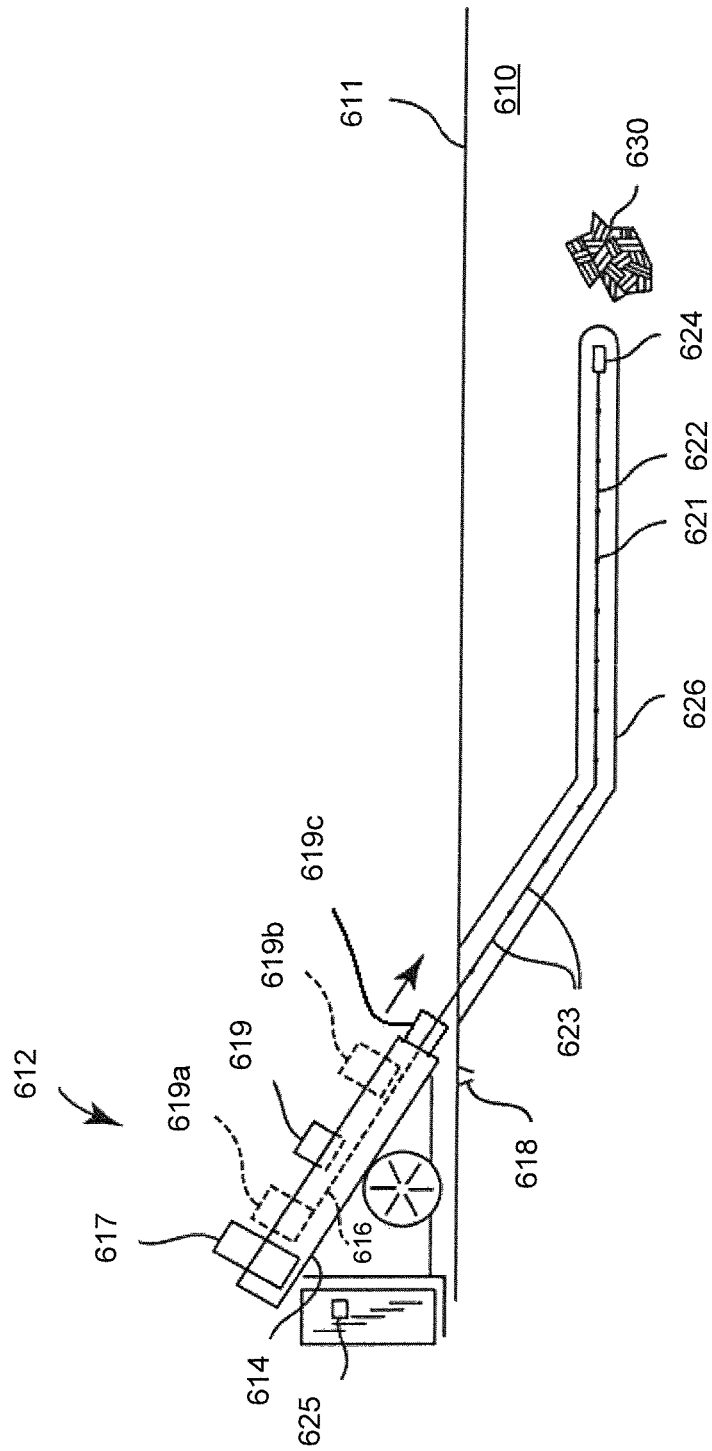
FIG. 6 shows a cross-section through a portion of ground where a boring operation takes place using an horizontal directional drilling machine configured for imaging underground objects using spatial sampling customization according to various embodiments.

FIG. 6 shows a cross-section through a portion of ground where a boring operation takes place. The underground boring system, generally shown as the HDD machine 612, is situated above ground 611 and includes a platform 614 on which is situated a tilted longitudinal member 616. The platform 614 is secured to the ground by pins 618 or other restraining members in order to resist platform 614 movement during the boring operation. Located on the longitudinal member 616 is a thrust/pullback pump 617 for driving (i.e., displacing) a drill string 622 in a forward, longitudinal direction as generally shown by the arrow. The drill string 622 is made up of a number of drill string members 623 attached end-to-end. Also located on the tilted longitudinal member 616, and mounted to permit movement along the longitudinal member 616, is a rotation motor or pump 619 for rotating the drill string 622 (illustrated in an intermediate position between an upper position 619*a* and a lower position 619*b*). In operation, the rotation motor 619 rotates the drill string 622 which has a boring tool 624 attached at the distal end of the drill string 622.

A typical boring operation can take place as follows. The rotation motor 619 is initially positioned in an upper location 619*a* and rotates the drill string 622. While the boring tool 624 is rotated through rotation of the drill string 622, the rotation motor 619 and drill string 622 are pushed in a forward direction by the thrust/pullback pump 617 toward a lower position into the ground, thus creating a borehole 626. The rotation motor 619 reaches a lower position 619*b* when the drill string 622 has been pushed into the borehole 626 by the length of one drill string member 623. A new drill string member 623 is then added to the drill string 622 either manually or automatically, and the rotation motor 619 is released and pulled back to the upper location 619*a*. The rotation motor 619 is used to thread the new drill string member 623 to the drill string 622, and the rotation/push process is repeated so as to force the newly lengthened drill string 622 further into the ground, thereby extending the borehole 626.

Commonly, water or other fluid is pumped through the drill string 622 (referred to herein as mud) by use of a mud pump. If an air hammer is used, an air compressor is used to force air/foam through the drill string 622. The mud or air/foam flows back up through the borehole 626 to remove cuttings, dirt, and other debris and improve boring effectiveness and/or efficiency.

A directional steering capability is typically provided for controlling the direction of the boring tool 624, such that a desired direction can be imparted to the resulting borehole 626. By these actions, and various combinations of these basic actions, a boring procedure can advance a boring tool 624 through soil, including advancing the boring tool 624 through a turn. Because HDD typically does not bore a hole very far from the surface of the ground, many belowground obstacles (e.g., sewers, electrical lines, building foundations, etc.) must be maneuvered around. As such, many boring tools are configured to allow the bore path to turn (e.g., left, right, higher, lower) to curve the bore path around underground obstacles.

In accordance with some embodiments, the system also includes an encoder 619*c* to monitor of the position of the boring tool 624. As the drill head 624 is pushed into the ground, a cable plays out and advances the encoder 619*c*, providing the system software with a measure of the drill head location and triggering radar electronics at discrete distance intervals.

Adequate imaging or detection of underground objects from a platform of a rotating directional drill depends on correct sampling of the complete three dimensional space surrounding the sensor. Addressing the specific case of a drill head radar, such as a GPR, several interrelated parameters determine this acceptable and, in some embodiments, optimal sampling rate. Concerning the HDD machine, both rotation rate and advance rate (i.e., displacement rate) are important. The key parameters for the drill head radar include:

1. The time required to acquire a single data scan;
2. The largest step size possible for acceptable resolution along the bore direction; and
3. The minimum number of angular segments (or the maximum angular sampling rate) for a rotating drill in terms of degrees per sample.

When operating an HDD system equipped with a spatial sampling customization facility according to various embodiments, an operator typically sets either the displacement rate or rotation rate as the controlling parameter. Given one of these settings, the remaining operating parameters may be computed. This then serves to set interlocking controls that ensure that the HDD drill (i.e., drill string and cutting tool) is not being run at speeds beyond those at which adequate spatial sampling can occur. For example, if the HDD drill is run under bore displacement control, the operator sets the desired advance rate. Based on requirements for angular sampling, maximum spatial sampling along the bore, and the time required for each sample to be collected, the rotation rate (and other parameters) is fixed under HDD machine control and cannot be changed by the operator. Equivalently, the operator may set an operating rotation rate to ensure mud flow or to keep the hole open. The rotation rate then serves as the control that constrains all other data collection parameters. Again, HDD machine interlocks are used to ensure that the HDD drill is not operated beyond limits for achieving adequate spatial sampling.

It is noted that, while there are interlock systems for conventional HDD drilling systems, none of these conventional systems specifically deal with enhancing or optimizing drilling settings for spatial sampling of rotationally dependent sensors that are mounted on or near an HDD drill head. Various embodiments provide for enhanced or optimal sensor sampling as a means of dynamically maintaining the best operating parameters for a rotationally dependent sensor, such as a drill head GPR, during drilling. This enhanced sensing capability provides for greater ease of operation while delivering the best possible information from the sensors.

According to various embodiments, the equations defining the approach described hereinabove are as follows. The variables are defined as:

$t_s$=time to acquire a single scan or data point;
$S_{max}$=maximum step size along the drill string axis for acceptable longitudinal spatial resolution (along the dimension parallel to the drill string);
$N_a$=number of azimuthal angular segments per rotation, needed for acceptable angular resolution;
$V_{max}$=maximum forward speed allowed of the drill string/cutting tool;
R=rotation rate of the drill string required for proper sampling;
$S_a$=maximum forward step size for each sensor sample in the bore direction, assuming one sensor sample (or scan) is taken per azimuthal angular segment;
$t_{max}$=time required to move on step (Smax) forward;
a=angular segment size;

$$S_a = \frac{S_{max}}{N_a}$$

$$t_{max} = (t_s)(N_a)$$

The equations above state that there be at least one scan acquired per angular segment per rotation, and that all angular segments be collected per large forward step ($S_{max}$). In terms of the fundamental constants:

$$V_{max} = \frac{S_{max}}{t_{max\square}} = \frac{S_{max}}{(t_s N_a)}$$

$$R = \frac{a}{t_s} = \frac{2\pi}{(t_s N_a)}$$

To enhance or, in some embodiments, optimize the performance of the HDD system, each angular segment is to be sampled on every rotation, and acquiring the scans for each segment is to be done at the same angular position of the drill head. Therefore, the critical sampling should occur at the rates given in the equations below, with no arbitrary oversampling:

$$V_{max} = \frac{(S_{max}R)}{2\pi}$$

-continued $$R = \frac{(2\pi V_{max})}{S_{max}}$$

The equations above set forth relations between rotational speed (R) and linear advance rate ($V_{max}$). Since a constant rotation rate is assumed, increasing the number of scans taken per angular segment is the same as simply increasing the number of angular segments because during the time it takes to acquire a scan, the drill string/cutting tool will rotate and a subsequent scan will be taken at a different angle. Since there will be a single revolution per $N_a$ samples, the number of angular segments can be defined in terms of scan time and rotation rate.

If critical sampling is maintained, as described above, the various angular segments (or angular resolution elements) will be sampled at a unique angular position that will be the same for each segment on every rotation of the drill string/cutting tool. This means that every angular segment will be sampled once per rotation with an angular spacing of $2\pi$ radians and linear spacing of $S_{max}$.

Since the criterion above requires that the maximum overall step size (linear resolution element) be subdivided so that each angular segment is sampled within every maximum step ($S_{max}$), the samples for each segment will be spaced by one 'maximum step', $S_{max}$, in the drill string dimension. Assuming also that there is constant forward motion of the drill, the samples for each angular segment, per rotation, will be separated from each other along the drill string dimension by $S_{max}/N_a$.

A procedure to set the operating parameters would follow the outline given below. If the HDD drill parameters are chosen with the rotation rate serving as the primary control, the first parameter set is the number of radar traces collected per second (T=1/$t_s$). This value is a fundamental limit set by the radar hardware. The same would be true for any other sensor, as this would be the limit in terms of how quickly the data could be collected. Two other parameters are then set internally to the radar/machine control; the maximum sample spacing along the drill bore ($S_{max}$), and the minimum number of angular samples ($N_a$) necessary to have adequate rotational sampling. The operator may then enter the desired rotation rate in RPM. Subject to the constraints of T, $S_{max}$ and $N_a$, other data collection parameters are set. If the desired rotation rate is not compatible with constraints, the maximum allowable rotation rate is set automatically by HDD machine controller based on signals (e.g., max rotation rate limit signal) produced by the spatial sampling customization processor of the HDD system.

EXAMPLE 1

In the following example, it is assumed that $S_{max}$ has been set to 2.54 cm (1 inch), and the minimum $N_a$=36 (10 degrees per sample). The corresponding RPM rates allowed for appropriate data sampling density are then set through interlocked calculations made by the spatial sampling customization processor of the HDD system. In the plot shown in FIG. 7, the number of angular (azimuthal) samples ($N_a$) is shown as a function of rod RPM and number of samples per second (T). The flattening of the curves at 36 rpm reflects this as the minimum allowed angular sampling, $N_a$.

Figure 7:
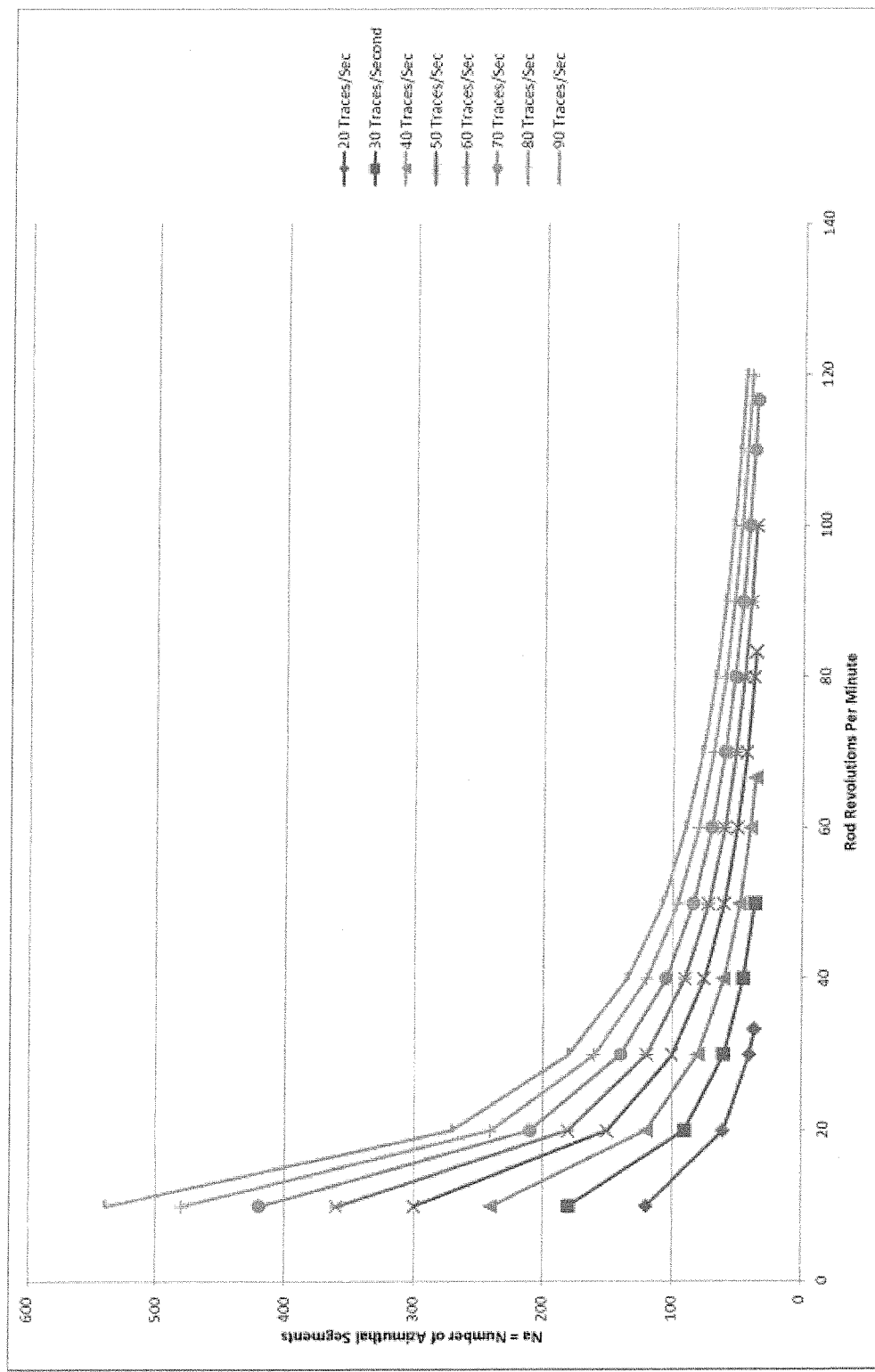
FIG. 7 is a plot showing the limiting effect of the number of traces/second (or samples/second) of a rotationally dependent sensor on both the drill string/cutting tool rotation rate and advance speed that can be supported while maintaining adequate minimum sampling according to various embodiments.

The plot of FIG. 7 illustrates that, given a hard constraint of the number of traces/second (or samples/second), there are limits on both the drill string/cutting tool rotation rate and advance speed that can be supported while maintaining adequate minimum sampling. For example, if the data collection rate is 30 traces/second, the minimum $N_a$ is 36, and the maximum revolution rate allowed is 50 rpm. Related to this is the advance rate. This rate is also limited, in this case to 2.4 minutes per 10 ft rod or 0.83 in/second. Higher data collection rates allow higher rod rotation rates and advance speeds. At $N_a=36$, 90 traces/second, and 120 rpm, a 10 foot rod can be inserted in 1 minute with proper data sampling.

In accordance with various embodiments, another approach is for the operator to set the drill advance (displacement) rate as the controlling factor. As with rotation control, both the number of traces collected per second (T) and the maximum sampling interval along the bore path, $S_{max}$, are set within the radar. The drill string advance rate is then set by the operator, subject to the constraints of number of traces per second (T), maximum sample interval ($S_{max}$), and minimum number of angular segments, $N_a$. This will also serve to constrain the drill string rotation rate in revolutions per minute. There are several ways in which to visualize these data.

EXAMPLE 2

Figure 8:
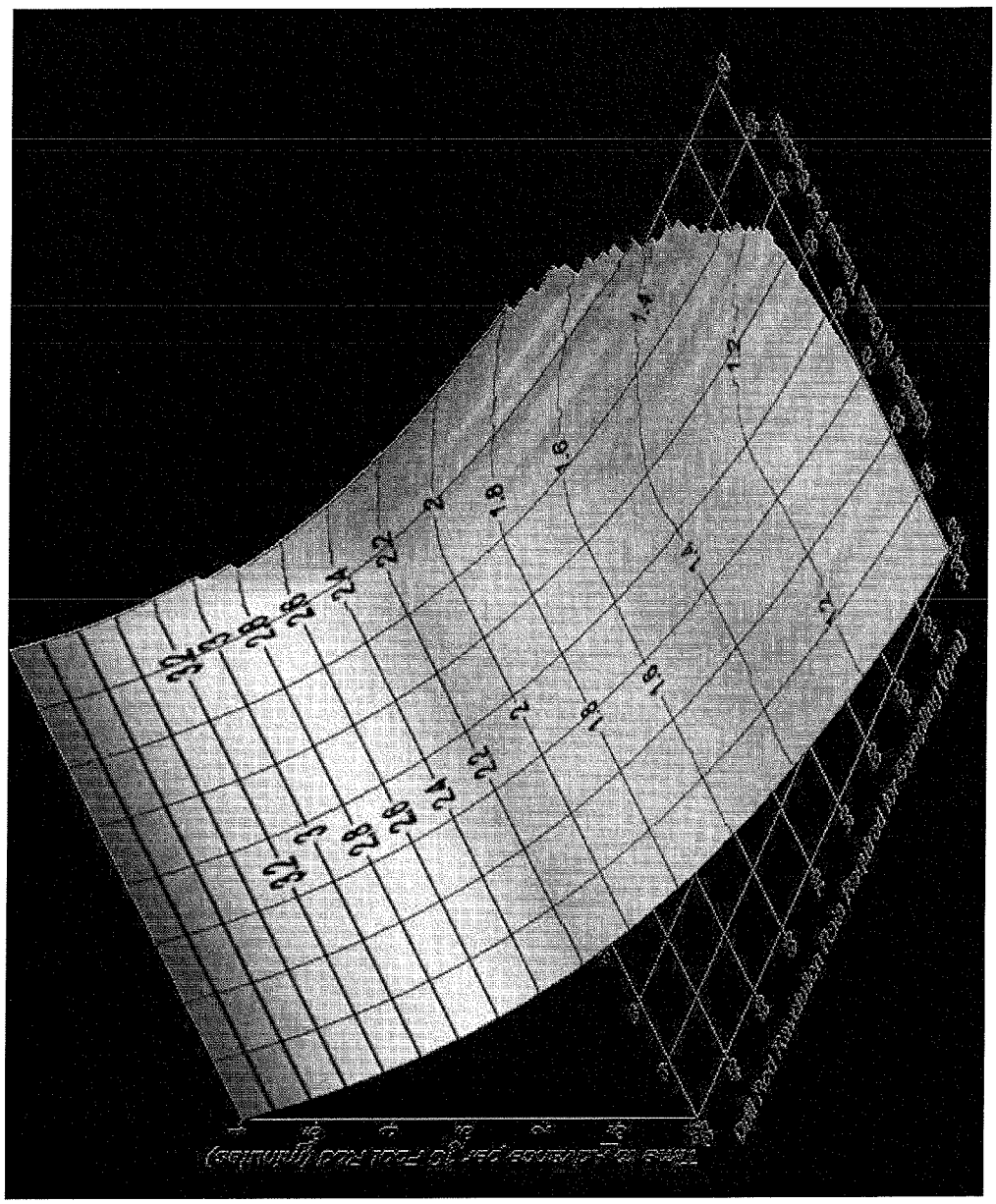
FIG. 8 is a plot showing that a given advance speed of a drill rod can be attained for a range of sample speeds, T, and revolution rates while maintaining adequate minimum sampling according to various embodiments.

In the plot shown in FIG. 8, it is assumed that the parameters T, $N_a$, $S_{max}$ have been set. A desired drill string displacement rate can then be input, but this could be modified by the constrained parameters. Based on these parameters, the fastest time needed for a 10 foot drill rod to be inserted into the borehole, while maintaining adequate sampling, is 1 minute. This can only be attained with a sample rate, T, of 72 traces per second or more and a drill rod/string rotation rate of 120 rpm. Other insertion times are possible with slower sample and rotation rates, as given in the plot of FIG. 8. So, the operator can be prohibited from advancing the drill rod into the ground faster than adequate sampling will allow.

The plot of FIG. 8 also shows that a given advance speed (given in terms of the time required for a 10 ft rod) can be attained for a range of sample speeds, T, and revolution rates. However, if T gets too small, the revolution rate has to increase to maintain the advance rate, but a limit is reached where the advance rate cannot be met given other constraints. Again, in general, higher data collection rates allow higher revolution rates and faster drill advance speeds. But, to keep correct angular sampling, the rotation rate must be increased as the desired advance rate is increased.

Figure 9A:
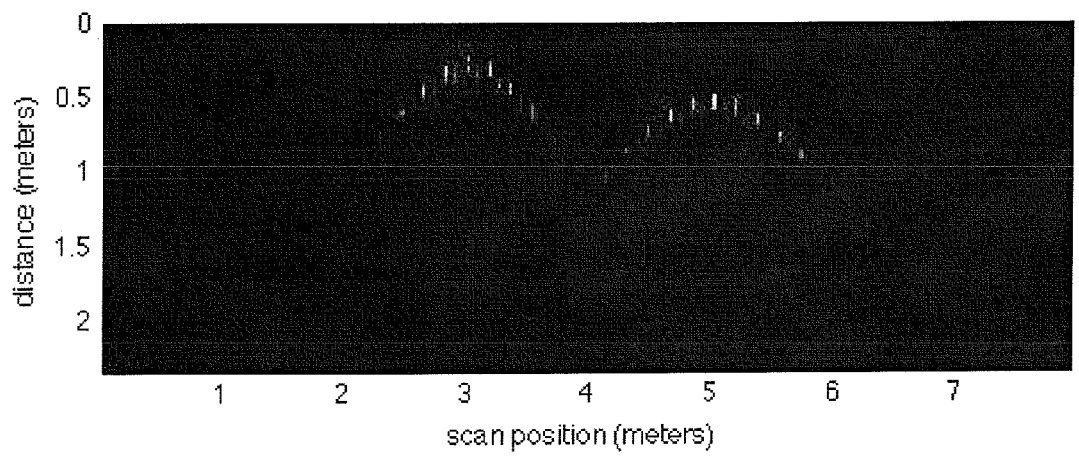
FIGS. 9A-9C are plots showing angular sampling at 1.4 (FIG. 9A), 2.3 (FIG. 9B), and π radians (FIG. 9C) rotation per each $S_{max}$, respectively, and that acceptable sampling may be attained at an integral number of π radians per revolution in accordance with various embodiments.
Figure 9B:
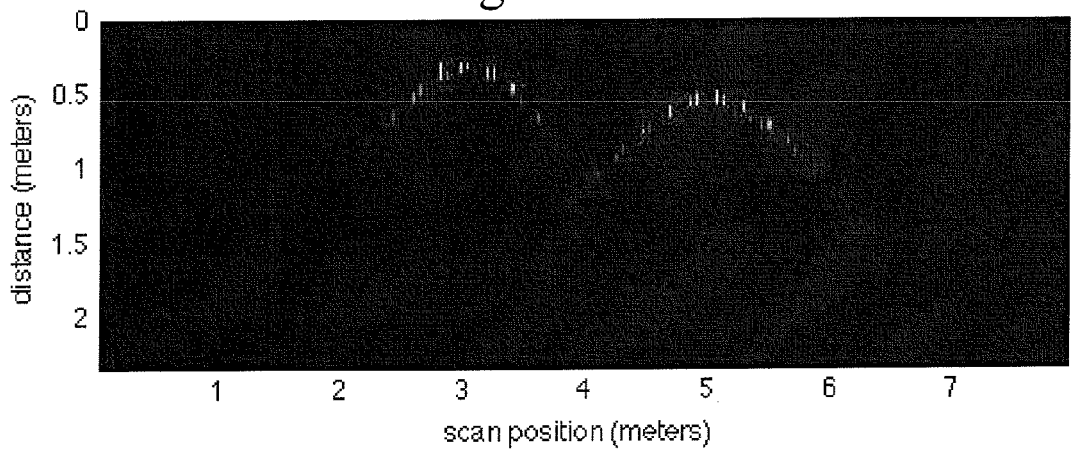
Figure 9C:
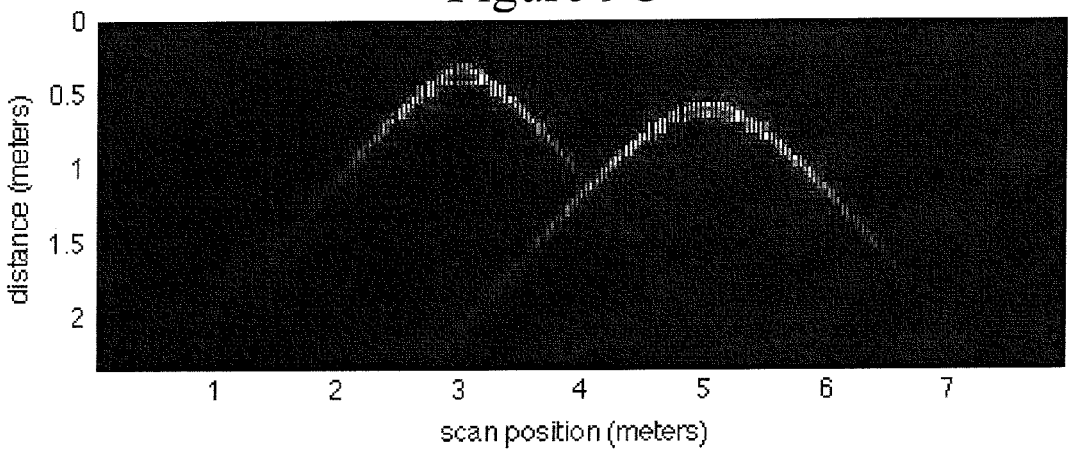

According to various embodiments, to obtain enhanced or optimal spatial sampling, the rotation rate should be an integral number of $2\pi$ radians (or 360 degrees) for each forward step, $S_{max}$. Thus, for each $S_{max}$ step, the drill rod should complete n full rotations, where n is an integer. This ensures that the azimuthal position is sampled at the same point in all rotations. FIGS. 9A-9C show angular sampling at 1.4 (FIG. 9A), 2.3 (FIG. 9B), and $\pi$ radians (FIG. 9C) rotation per each $S_{max}$, respectively. FIGS. 9A-9C show that the spatial sampling improves as the rotation rate approaches $2\pi$. It is noted that, while the rate in representative plots of FIGS. 9A-9C was not made at $2\pi$ radians per revolution, the improvement in sampling is evident. Best sampling is attained at $2\pi$ radians, but acceptable sampling may be attained at an integral number of $\pi$ radians per revolution.

In addition to setting HDD drill parameters, the interlock system of the HDD system can be used to limit the drill string/cutting tool advance rate so that the volume of drill mud pumped downhole will not be outstripped by the drill rod advance rate, resulting in lost circulation. The parameters of interest are:

Vmax=advance rate
P=pumping capacity
H=drill head diameter
R=rod diameter

In this case, the rotation rate is not a critical parameter. The change in annulus volume per unit time is given by:

$$(\pi/4)(H-R)^2 V_{max} = \Delta V$$

Therefore, the change in volume per unit time must be less than or equal to the pump capacity, as characterized by:

$$V_{max} \leq \frac{4P}{\pi(H-R)^2}$$

In the equation above, the pump capacity, P, is the effective flow or pump rate reduced by whatever amount of fluid is needed to flow out of the hole to maintain circulation or is lost in other ways.

To implement a sampling system, a form of computer control is desired. Once the operating parameters are fixed as described above, the computer (e.g., HDD machine processor) can provide control over HDD machine operating systems through a control network, such as a CAN bus. Other control systems are available, and would operate in a similar manner. After an operator chooses a set of parameters, the computer checks these parameters to ensure that adequate sampling or control is possible, makes any necessary limitations, and controls the HDD mechanical system through a control network. As such, a spatial sampling customization facility of the HDD system implemented in accordance with various embodiments of the disclosure provides the ability to automatically set HDD drilling and sensor parameters so that enhanced or optimal detection or sampling parameters are set. This removes the operator as a possible source of error and serves to ensure that the sensor or sensors operates at its/their maximum capability.

The discussion and illustrations provided herein are presented in an exemplary format, wherein selected embodiments are described and illustrated to present the various aspects of the present invention. Systems, devices, or methods according to the present invention may include one or more of the features, structures, methods, or combinations thereof described herein. For example, a device or system may be implemented to include one or more of the advantageous features and/or processes described below. A device or system according to the present invention may be implemented to include multiple features and/or aspects illustrated and/or discussed in separate examples and/or illustrations. It is intended that such a device or system need not include all of the features described herein, but may be implemented to include selected features that provide for useful structures, systems, and/or functionality.

Although only examples of certain functions may be described as being performed by circuitry for the sake of brevity, any of the functions, methods, and techniques can be performed using circuitry and methods described herein, as would be understood by one of ordinary skill in the art.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A method, comprising:
rotating a drill string to which a sensor is attached, the sensor having a maximum sampling capability;
displacing the drill string along a bore path;
sampling, using the sensor, a three-dimensional space surrounding the sensor while rotating and displacing the drill string; and
adjusting at least one of drill string rotation and drill string displacement so that the maximum sampling capability of the sensor is not exceeded and at least a minimum angular sampling rate is achieved;
wherein adjusting at least one of the drill string rotation and the drill string displacement is based on a relationship between drill string rotation rate and drill string linear displacement rate given by:

$$R = \frac{(2\pi V_{max})}{S_{max}}$$

and $$V_{max} = \frac{(S_{max} R)}{2\pi}$$

wherein $V_{max}$ is maximum linear displacement rate, $S_{max}$ is maximum longitudinal step size along the drill string axis, and R is rotation rate of the drill string.

2. The method of claim 1, wherein adjusting comprises decreasing at least one of drill string rotation and drill string displacement.

3. The method of claim 1, wherein adjusting comprises increasing at least one of drill string rotation and drill string displacement.

4. The method of claim 1, wherein adjusting comprises limiting at least one of drill string rotation and drill string displacement.

5. The method of claim 1, further comprising:
setting the drill string rotation at a desired rate; and
adjusting a rate of the drill string displacement so that the maximum sampling capability of the sensor is not exceeded and at least the minimum angular sampling rate is achieved.

6. The method of claim 1, further comprising:
setting the drill string displacement at a desired rate; and
adjusting a rate of the drill string rotation so that the maximum sampling capability of the sensor is not exceeded and at least the minimum angular sampling rate is achieved.

7. The method of claim 1, wherein the sampling of the space surrounding the sensor is based on:
a time required to acquire a sample by the sensor;
the maximum longitudinal step size, $S_{max}$; and
a maximum angular sampling rate for the sensor.

8. The method of claim 1, comprising:
setting the drill string rotation to a desired rate;
calculating the number of sensor samples that can be collected based on a time required to acquire a sample by the sensor;
calculating the maximum longitudinal step size, $S_{max}$; and
calculating a minimum number of angular samples.

9. The method of claim 1, wherein sampling the three-dimensional space surrounding the sensor comprises sampling a plurality of angular segments at regular angular positions on every rotation of the drill string.

10. The method of claim 9, wherein:
the sampling of the space surrounding the sensor is based at least on the maximum longitudinal step size, $S_{max}$; and
a plurality of samples, $N_a$, for each angular segment per rotation are separated from each other along an axis of the drill string by $S_{max}/N_a$.

11. The method of claim 9, wherein:
the sampling of the space surrounding the sensor is based at least on the maximum longitudinal step size, $S_{max}$;
the maximum longitudinal step size, $S_{max}$, is subdivided so that each angular segment is sampled within every maximum longitudinal step size, $S_{max}$; and
the samples for each angular segment are spaced by one maximum longitudinal step size, $S_{max}$, along an axis of the drill string.

12. The method of claim 1, wherein the sampling by the sensor facilitates detection of a subsurface object prior to a collision between the object and the drill string.

13. The method of claim 1, wherein the rotating and displacing of the drill string are implemented by a Horizontal Directional Drilling machine.

14. A system, comprising:
a drill string to which a sensor is attached, the sensor having a maximum sampling capability;
a rotation unit configured to rotate the drill string;
a displacement unit configured to longitudinally displace the drill string; and
a processor coupled to the rotation and displacement units and the sensor, the processor being configured to control sampling, by the sensor, of three-dimensional space surrounding the sensor and further configured to adjust at least one of drill string rotation and drill string displacement so that the-maximum sampling capability of the sensor is not exceeded and at least a minimum angular sampling rate is achieved;
wherein the processor is configured to:
coordinate sampling a plurality of angular segments at regular angular positions on every rotation of the drill string; and
sample the space surrounding the sensor based at least on a maximum longitudinal step size, $S_{max}$, along the bore path direction; and
a plurality of samples, $N_a$, for each angular segment per rotation are separated from each other along an axis of the drill string by $S_{max}/N_a$.

15. The system of claim 14, wherein the processor is configured to execute interlock logic that causes the processor to limit at least one of the drill string rotation and the drill string displacement so that the maximum sampling capability of the sensor is not exceeded and at least the minimum angular sampling rate is achieved.

16. The system of claim 14, wherein the processor, in response to setting the drill string rotation at a desired rate, is configured to adjust a rate of the drill string displacement so that the maximum sampling capability of the sensor is not exceeded and at least the minimum angular sampling rate is achieved.

17. The system of claim 14, wherein the processor, in response to setting the drill string displacement at a desired rate, is configured to adjust a rate of the drill string rotation so that the maximum sampling capability of the sensor is not exceeded and at least the minimum angular sampling rate is achieved.

18. The system of claim 14, wherein the processor, in response to setting the drill string rotation at a desired rate, is configured to:
- calculate the number of sensor samples that can be collected based on a time required to acquire a sample by the sensor;
- calculate the maximum longitudinal step size, $S_{max}$; and
- calculate a minimum number of angular samples necessary to achieve at least the minimum angular sampling rate.

19. The system of claim 14, wherein the processor is configured to sample the space surrounding the sensor based on:
- a time required to acquire a sample by the sensor;
- the maximum longitudinal step size, $S_{max}$; and
- a maximum angular sampling rate for the sensor.

20. The system of claim 14, wherein:
- the processor is configured to sample the space surrounding the sensor based at least on the maximum longitudinal step size, $S_{max}$;
- the maximum longitudinal step size, $S_{max}$, is subdivided so that each angular segment is sampled within every maximum longitudinal step size, $S_{max}$; and
- the samples for each angular segment are spaced by one maximum longitudinal step size, $S_{max}$, along an axis of the drill string.

21. The system of claim 14, wherein the processor is configured to control a drill string rotation rate and a drill string linear displacement rate based on a relationship given by:

$$R = \frac{(2\pi V_{max})}{S_{max}}$$

and $$V_{max} = \frac{(S_{max} R)}{2\pi}$$

wherein $V_{max}$ is maximum linear displacement rate and R is rotation rate of the drill string.

22. The system of claim 14, wherein the sensor comprises a ground penetrating radar.

23. The system of claim 14, wherein the sampling by the sensor facilitates detection of a subsurface object prior to a collision between the object and the drill string.

24. The system of claim 14, wherein the rotation unit and the displacement unit are integral to a Horizontal Directional Drilling machine.

25. A method, comprising:
rotating a drill string to which a sensor is attached;
displacing the drill string along a bore path;
sampling, using the sensor, three-dimensional space surrounding the sensor based on a predetermined relationship between a rate of drill string rotation and rate of linear displacement of the drill string, wherein the sampling of the space surrounding the sensor comprises sampling a plurality of angular segments at regular angular positions on every rotation of the drill string; and
adjusting at least one of drill string rotation and drill string displacement during the sampling of the space surrounding the sensor;
wherein:
- sampling of the space surrounding the sensor is based at least on a maximum longitudinal step size, $S_{max}$, along the bore path direction; and
- a plurality of samples, $N_a$, for each angular segment per rotation are separated from each other along an axis of the drill string by $S_{max}/N_a$.

26. A system, comprising:
a drill string to which a sensor is attached;
a rotation unit configured to rotate the drill string;
a displacement unit configured to longitudinally displace the drill string; and
a processor coupled to the rotation and displacement units and configured to control sampling by the sensor based on a predetermined relationship between a rate of drill string rotation and a rate of linear displacement of the drill string, the processor further configured to coordinate:
- sampling, by the sensor, of a three-dimensional space surrounding the sensor while rotating and displacing the drill string;
- adjusting at least one of the drill string rotation and the drill string displacement during sampling of the space surrounding the sensor; and
- sampling a plurality of angular segments at regular angular positions on every rotation of the drill string;
wherein:
- the processor is configured to sample the space surrounding the sensor based at least on a maximum longitudinal step size, $S_{max}$, along the bore path direction; and
- a plurality of samples, $N_a$, for each angular segment per rotation are separated from each other along an axis of the drill string by $S_{max}/N_a$.

* * * * *